(12) United States Patent
Culkin et al.

(10) Patent No.: US 9,225,073 B2
(45) Date of Patent: Dec. 29, 2015

(54) ACTIVE ELECTRONICALLY SCANNED ARRAY ANTENNA FOR HEMISPHERICAL SCAN COVERAGE

(71) Applicant: SRC, Inc., North Syracuse, NY (US)

(72) Inventors: Daniel R. Culkin, Cazenovia, NY (US); Timothy David Graham, Liverpool, NY (US)

(73) Assignee: SRC, Inc., North Syracuse, NY (US)

( * ) Notice: Subject to any disclaimer, the term of this patent is extended or adjusted under 35 U.S.C. 154(b) by 204 days.

(21) Appl. No.: 13/971,062

(22) Filed: Aug. 20, 2013

(65) Prior Publication Data
US 2013/0335269 A1    Dec. 19, 2013

Related U.S. Application Data

(62) Division of application No. 12/855,374, filed on Nov. 29, 2010, now Pat. No. 8,547,275.

(51) Int. Cl.
*H01Q 3/26* (2006.01)
*H01Q 21/20* (2006.01)
(Continued)

(52) U.S. Cl.
CPC ............ *H01Q 21/20* (2013.01); *G01S 13/4463* (2013.01); *H01Q 9/285* (2013.01); *H01Q 21/205* (2013.01)

(58) Field of Classification Search
CPC ...... H01Q 21/20; H01Q 21/205; H01Q 9/285
USPC .......... 343/754, 778, 853; 342/371, 373, 374, 342/375
See application file for complete search history.

(56) References Cited

U.S. PATENT DOCUMENTS

| 2,471,021 A | * | 5/1949 | Bradley | ................. H01P 1/163 333/21 R |
| 2,994,873 A | * | 8/1961 | Goubau | .................... H01P 3/20 343/753 |

(Continued)

FOREIGN PATENT DOCUMENTS

| EP | 1035615 | 9/2000 |
| EP | 1486798 | 12/2004 |

(Continued)

OTHER PUBLICATIONS

Great Britain Examination Report dated Mar. 24, 2014, pp. 1-5.
(Continued)

*Primary Examiner* — Tho G Phan
(74) *Attorney, Agent, or Firm* — George R. McGuire; Bond Schoeneck & King, PLLC

(57) ABSTRACT

An antenna architecture for hemispherically-scanning active electronically scanned arrays (AESA). The antenna architecture utilizes variable diameter disks of antenna elements configured in a conical implementation. The antenna elements are oriented such that the element boresight is normal to the surface of the conical structure. Beamforming takes place on each disk first, and them separately in combining the signals from each disk, thereby reducing complexity. The antenna optionally utilizes disks of antenna elements of the same diameter to form a cylindrical antenna, which when combined with a conical configuration create enhanced sectors while maintaining a hemispherical coverage capability. Further, use of two conical configurations can produce a fully spherical coverage capability.

6 Claims, 11 Drawing Sheets

(51) Int. Cl.
*G01S 13/44* (2006.01)
*H01Q 9/28* (2006.01)

(56) References Cited

U.S. PATENT DOCUMENTS

| | | | |
|---|---|---|---|
| 3,803,618 A | 4/1974 | Coleman | |
| 3,971,022 A * | 7/1976 | Lenz | H01Q 25/005 342/376 |
| 4,162,499 A | 7/1979 | Jones, Jr. et al. | |
| 4,792,808 A | 12/1988 | Hildebrand | |
| 4,899,162 A | 2/1990 | Bayetto et al. | |
| 4,980,692 A | 12/1990 | Rudish et al. | |
| 5,017,927 A | 5/1991 | Agrawal | |
| 5,066,956 A | 11/1991 | Martin | |
| 5,512,906 A | 4/1996 | Speciale | |
| 5,650,788 A * | 7/1997 | Jha | H01Q 1/242 343/700 MS |
| 5,872,547 A * | 2/1999 | Martek | H01Q 1/246 342/375 |
| 5,905,466 A | 5/1999 | Jha | |
| 6,067,055 A | 5/2000 | Vaidyanathan | |
| 6,195,043 B1 * | 2/2001 | Azzarelli et al. | G01S 3/06 342/362 |
| 6,496,064 B2 | 12/2002 | Rzyski | |
| 6,642,908 B2 | 11/2003 | Pleva et al. | |
| 6,664,938 B2 * | 12/2003 | Strickland | H01Q 21/067 343/853 |
| 6,768,456 B1 | 7/2004 | Lalezari et al. | |
| 6,992,622 B1 | 1/2006 | Chiang et al. | |
| 7,248,210 B2 | 7/2007 | Bruce et al. | |
| 7,576,682 B1 | 8/2009 | Yu | |
| 8,976,066 B2 * | 3/2015 | Manasson et al. | H01Q 21/061 342/375 |
| 2002/0163480 A1 | 11/2002 | Eiges | |
| 2006/0092075 A1 | 5/2006 | Bruce | |
| 2007/0195000 A1 | 8/2007 | Balling et al. | |
| 2008/0088520 A1 | 4/2008 | Chekroun et al. | |

FOREIGN PATENT DOCUMENTS

| | | |
|---|---|---|
| EP | 2090995 | 8/2009 |
| JP | 57123704 | 8/1982 |
| JP | 2006217056 | 8/2006 |
| JP | 2007096975 | 4/2007 |

OTHER PUBLICATIONS

John R Stralka, William G. Fedarko, Pulse Doppler Radar, Radar Handbook, 2008, Chapter 4, pp. 4.1-4 and 4.2, Digital Engineering Library @McGraw-Hill, www.digitalengineeringlibrary.com.

U.S. Appl. No. 12/955,374, filed Aug. 20, 2013.

* cited by examiner

ACTIVE ELECTRONICALLY SCANNED ARRAY ANTENNA FOR HEMISPHERICAL SCAN COVERAGE

CROSS-REFERENCE TO RELATED APPLICATIONS

The present application is a divisional of and claims priority to U.S. Non-Provisional application Ser. No. 12/955,374 filed on Nov. 29, 2010, now allowed, which is hereby incorporated by reference in its entirety.

BACKGROUND OF THE INVENTION

1. Field of the Invention

The present invention relates to an active electronically scanned array antenna, and, more specifically, to an active electronically scanned array antenna for hemispherical scan coverage.

2. Description of the Related Art

Radar systems use antennas to transmit and receive electromagnetic ("EM") signals in various ranges of the EM band. While traditional radar systems used moving parts to physically point the antenna towards different target fields, modern radar systems use a passive electronically scanned array ("PESA") in which a central EM signal is split into hundreds or thousands of paths by phase shift modules which send the signal into individual antenna elements (i.e. the antenna's electrical conductor material). A single radar unit can contain thousands of individual transmit receive modules ("TR") rather than the single TR module of traditional radars, with each module functioning as an individual radar. Since transmission of the EM signal can be selectively delayed at each individual TR module, the electromagnetic signal, also called the "beam," is steered without requiring movement of the antenna elements. In most radars, the TR module contains a receiver, power amplifier, a digitally controlled phase/delay element, and a gain element.

In an active electronically scanned array ("AESA") each antenna element possesses its own EM signal source. As a result, each individual AESA antenna element can transmit a different EM frequency and the radar can capture a much more coherent radar profile of the target field. An AESA radar can steer the EM signal very quickly, and the TR modules can function in series to process a single project or function in parallel to complete several projects simultaneously. There are many additional advantages of AESA radars that can be found in the literature.

Despite these advantages, there are still significant obstacles to widespread adoption of AESA-based radar systems. For example, an AESA radar system using hundreds or thousands of TR modules can be prohibitively expensive.

BRIEF SUMMARY OF THE INVENTION

It is therefore a principal object and advantage of the present invention to provide a hemispheric ally-scanning AESA digital antenna.

It is another object and advantage of the present invention to provide a combined cylindrical/conical antenna architecture for a hemispherically-scanning AESA radar.

It is yet another object and advantage of the present invention to provide a hemispherically-scanning AESA that does not require individual channels for each individual element.

Other objects and advantages of the present invention will in part be obvious, and in part appear hereinafter.

In accordance with the foregoing objects and advantages, the present invention provides a combined cylindrical/conical antenna architecture that significantly reduces the number of channels from one for each element to one for each disk level.

According to a first aspect of the present invention is a hemispherically-scanning AESA architecture. The antenna comprises: (i) a first lower region which is generally cylindrical and which is made up of a plurality of platters with antenna elements arranged on the exterior circumference of each of the platters; (ii) a first upper region which is generally conical and which is also made up of a plurality of platters with antenna elements arranged on the exterior circumference of each of the platters; and (iii) one or more amplitude/phase modules on each platter, where each amplitude/phase module is coupled to two or more antenna elements. According to one embodiment of the present invention the platters are generally circular, and are stacked one upon another to form either the cylindrical array or the conical array. To form the conical array, each of the stacked platters in the conical region have a diameter which is smaller than the diameter of the platter beneath it in the stack.

A second aspect of the present invention provides a beamforming network in which each amplitude/phase module comprises a sum ($\Sigma$) azimuth beam path and a delta ($\Delta$) azimuth beam path, and where the sum ($\Sigma$) azimuth beam paths and the delta ($\Delta$) azimuth beam paths from each individual platter are combined.

A third aspect of the present invention provides a method for radar target detection. The method includes the steps of: (i) providing an antenna with a plurality of antenna elements arranged on the exterior circumference of a plurality of platters, and a plurality of amplitude/phase modules, where each of the plurality of amplitude/phase modules is coupled to two or more of the antenna elements; (ii) selecting a first subset of the plurality of antenna elements, where the subset ranges from one antenna element to every antenna element in the antenna; (iii) receiving a signal; (iv) calculating a sum ($\Sigma$) azimuth beam and a delta ($\Delta$) azimuth beam for each amplitude/phase module which is coupled to an antenna element in the subset of selected elements (ranging from one to all elements); (v) combining each sum ($\Sigma$) azimuth beam and a delta ($\Delta$) azimuth beam from every amplitude/phase module on each platter into a single sum ($\Sigma$) azimuth beam and a single delta ($\Delta$) azimuth beam for that platter; and (vi) forming an elevation beam. According to one embodiment of the present invention the method optionally includes one or more of the following steps: (i) converting each of the single sum ($\Sigma$) azimuth beam and the single delta ($\Delta$) azimuth beam to a digital signal prior to forming the elevation beam; (ii) down-converting the calculated sum ($\Sigma$) azimuth beam and the calculated delta ($\Delta$) azimuth beam; (iii) demodulating the digital signal; and/or (iv) amplifying the received signal.

A fourth aspect of the present invention provides radar system with: (i) an antenna having a plurality of antenna elements arranged on the exterior circumference of a plurality of platters, and a plurality of amplitude/phase modules, where each of the plurality of amplitude/phase modules is coupled to two or more antenna elements; (ii) means for selecting a first subset of the antenna elements; (iii) means for receiving a signal; (iv) means for calculating a sum ($\Sigma$) azimuth beam and a delta ($\Delta$) azimuth beam for each amplitude/phase module which is coupled to an antenna element in the selected subset; (v) means for combining each sum ($\Sigma$) azimuth beam and a delta ($\Delta$) azimuth beam from every amplitude/phase module on each platter into a single sum ($\Sigma$) azimuth beam and a single delta ($\Delta$) azimuth beam for that platter; and (vi) means for forming an elevation beam. According to one embodiment of the present invention the system optionally includes one or more of the following: (i) means for converting each of the sum (Σ) azimuth beams and the single delta (Δ) azimuth beams to a digital signal prior to forming the elevation beam; (ii) means for downconverting the calculated sum (Σ) azimuth beam and the calculated delta (Δ) azimuth beam; (iii) means for demodulating the digital signal; and (iv) means for amplifying the received signal.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
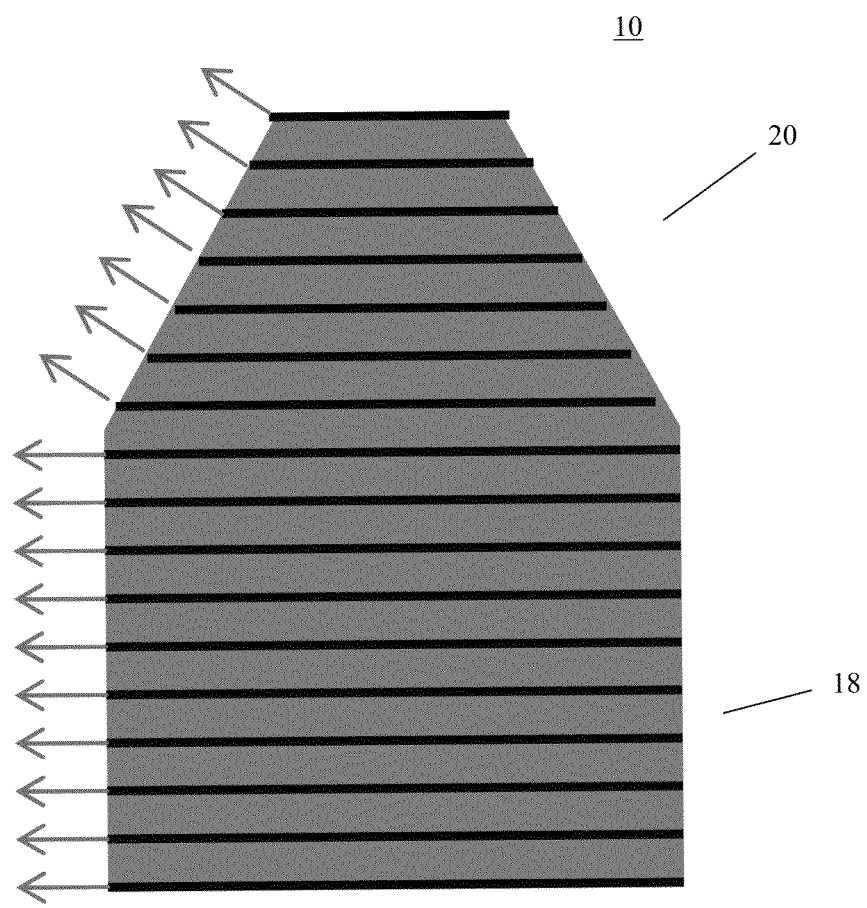
FIG. 1 is a schematic representation of a combined cylindrical/conical AESA according to one embodiment of the present invention.

Referring now to the drawings, wherein like reference numerals refer to like parts throughout, there is seen in FIG. 1 a schematic representation of a side view of a combined cylindrical/conical AESA radar denoted generally by numeral 10. The lower portion 18 of antenna 10 is comprised of a generally cylindrical array of individual antenna elements, wherein the elements are disposed at the exterior circumference of the cylinder, as discussed in greater detail below. An upper portion 20 of the radar is comprised of a generally conical array of individual antenna elements, wherein the elements are similarly disposed at the exterior circumference of the cone.

Figure 2:
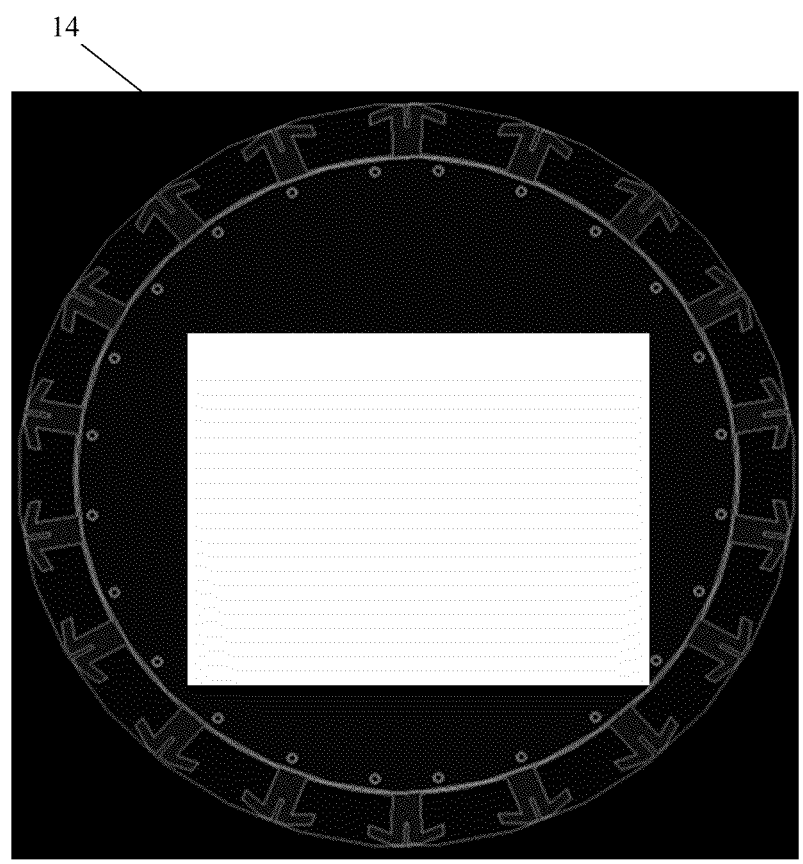
FIG. 2 is a schematic representation of a single circular platter section of the AESA radar according to one embodiment of the present invention.

FIG. 2 is a representation of a single circular disk 14 from antenna 10, constructed with radiating elements 12 along the edge of the structure. Disk 14 can be constructed with any element type and with any polarization characteristics required or desired by the designer. Each circular disk 14 can optionally include, among many other things, a power amplifier, a circulator, a low noise amplifier ("LNA"), a built-in-test circuit, and component packaging devices, depending on the design requirements. Although the embodiment described herein contains each of these elements, it will be recognized by one or ordinary skill in the art that variations of the general design can be employed to satisfy the specific needs of an end-user.

Associated with each disk 14 are one or more amplitude/phase ("amp/ph") modules. Each amp/ph module services multiple antenna elements 12, and the number of amp/ph modules in the radar or associated with each row of the radar will vary depending upon the number of antenna elements in that row and the number of simultaneous active elements in a given configuration. For example, if one-fourth of the antenna elements are to be active at a given time, each amp/ph module will service four elements. If one-third of the antenna elements are to be active at a given time, each amp/ph module will service three elements. If all antenna elements are to be active at the same time, amp/ph module can be associated with each element. However, when a single amp/ph module services multiple elements, there is both a component reduction and a cost savings.

Each amp/ph module contains two controlled paths, one corresponding to a sum "Σ" beam adjustment (used on both transmit and receive) and one corresponding to a delta "ΔA" Azimuth beam adjustment (used on receive only). The Σ Azimuth and Δ Azimuth paths from all amp/ph modules in a single disk 14 are combined together. This is the transmit drive distribution point for the disk, and is the combination point for the Σ and Δ receive paths (which can be digital or analog).

By combining the cylindrical/conical antenna shape with the 3:1 element selection in Azimuth, and each element set of each disk combined to form a set of azimuth beams, beamforming in the elevation dimension can be completely accomplished through the combination of azimuth beams. The complete reduction of one dimension at a time is just one advantage of this invention (compared to a scenario for which two dimensions of elements must be combined at the same time).

The ability of a typical radar system to scan off antenna boresight is typically limited by the projection of aperture in the direction of a volume of interest, as well as the radiation pattern of a given element. In general, the projection of the antenna aperture, sometimes referred to as the "effective aperture," is reduced by the cosine of the scanning angle multiplied by the aperture dimension corresponding to the scanned direction. For example, scanning 60 degrees off boresight of a planar surface will reduce the receive aperture by 50%. The radiation pattern of a given element can vary depending on the element type, and the dimensions of the element relative to the wavelength of the frequency of interest. In general, the element pattern can be approximated as a polynomial multiplied by a function of the cosine of the scanning angle, often the cosine squared. This results in peak element gain in the direction of boresight, and reduced gain off boresight.

Figure 3:
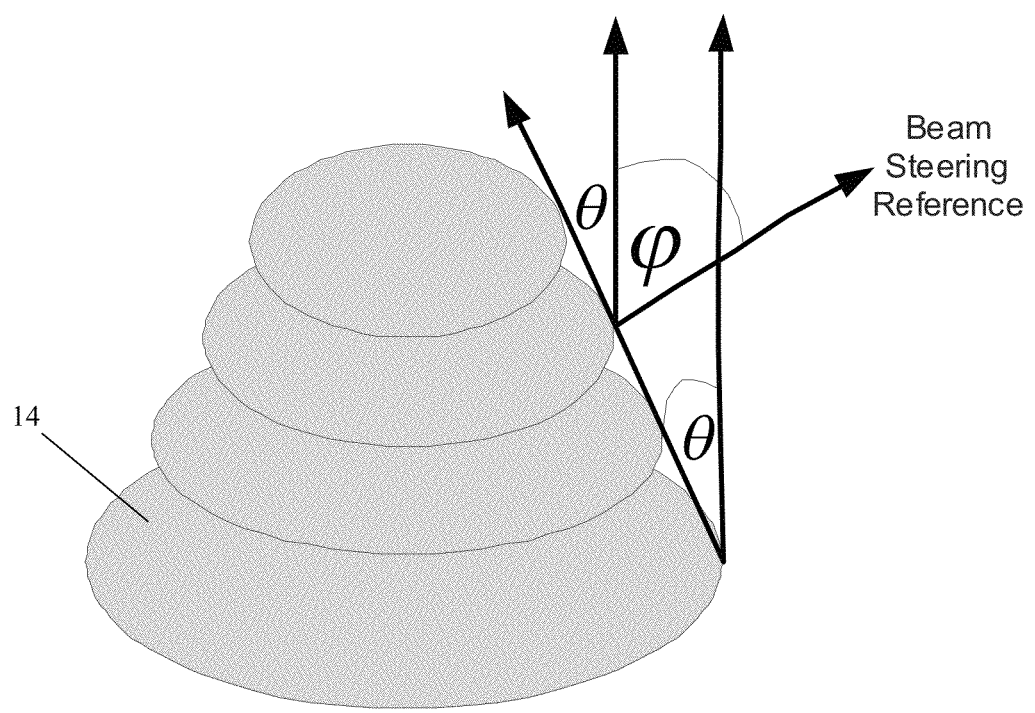
FIG. 3 is a representation of a simplified four-disk antenna where each concentric disk has a progressively smaller diameter.

In order to overcome these limitations, one embodiment uses a series of concentric "disks" of progressively smaller diameter to achieve an overall tilt angle with respect to the horizon. FIG. 3, for example, shows an example of such an embodiment with four concentric disks 14 of progressively smaller diameter which create an effective tilt angle, θ, referenced to the horizon. This angle then becomes the angle of reference for steering a beam. The steering angle from this reference, φ, can be added or subtracted from θ to determine the angle with reference to the horizon that can be achieved. As an example, if θ=45 degrees, the array could achieve 0-90° elevation coverage by scanning only ϕ=45 degrees off boresight, which maintains significant aperture. The actual tiltback angle can be chosen to maximize performance in a given angular region of the surveillance volume. For example, if greater gain were required at the horizon, but the application required some coverage to 90° elevation, the tiltback could be set to 30° so an aperture of 1 m would see a cos(30)=0.866 m effective aperture at the horizon and a cos(60)=0.5 m efficient aperture at zenith.

Figure 4:
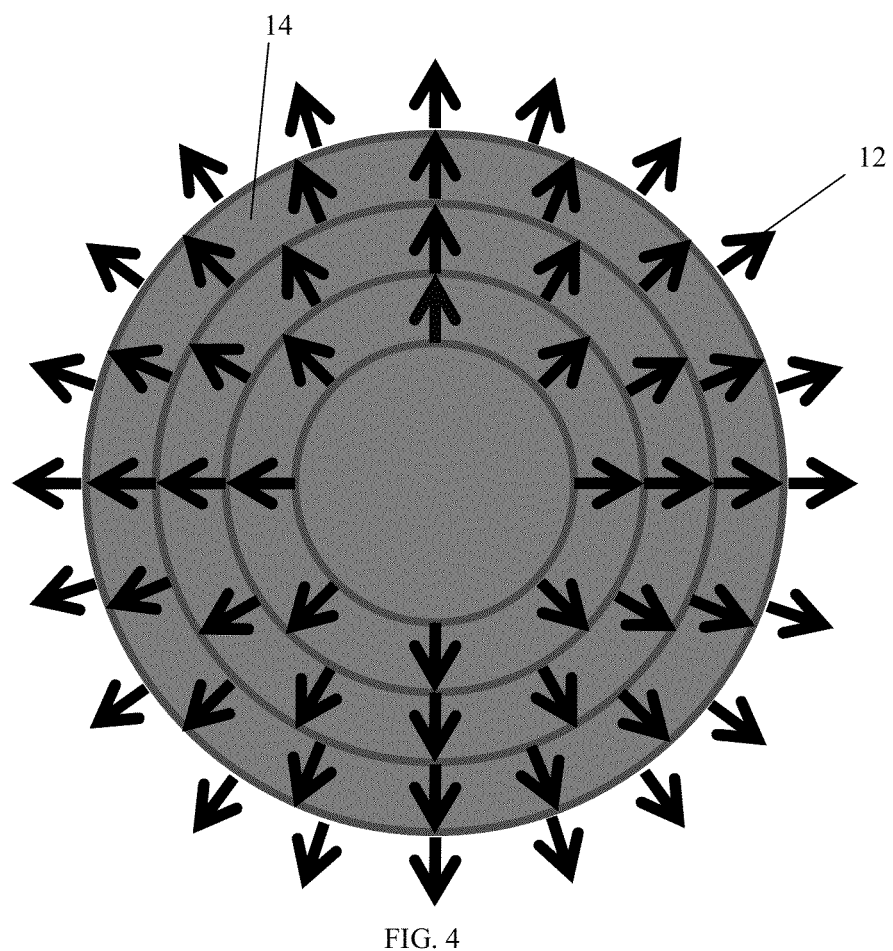
FIG. 4 is a top view of the four-disk antenna depicting the orientation of the elements according to one embodiment of the present invention.

One advantage of using circular disks is that any elements from any disk can be selected for a given beam, which allows for essentially uniform angular coverage over 360 degrees in azimuth for any elevation position. In order to keep element spacing uniform on each disk, the number of elements may decrease with each smaller circular disk. Shown in FIG. 4 is a top view of four stacked disks 14 with progressively smaller diameters, with radiating elements 12. According to another embodiment, the orientation of each of the individual disks 14 can be rotated to easily achieve any number of different elemental lattice configurations.

Figure 5:
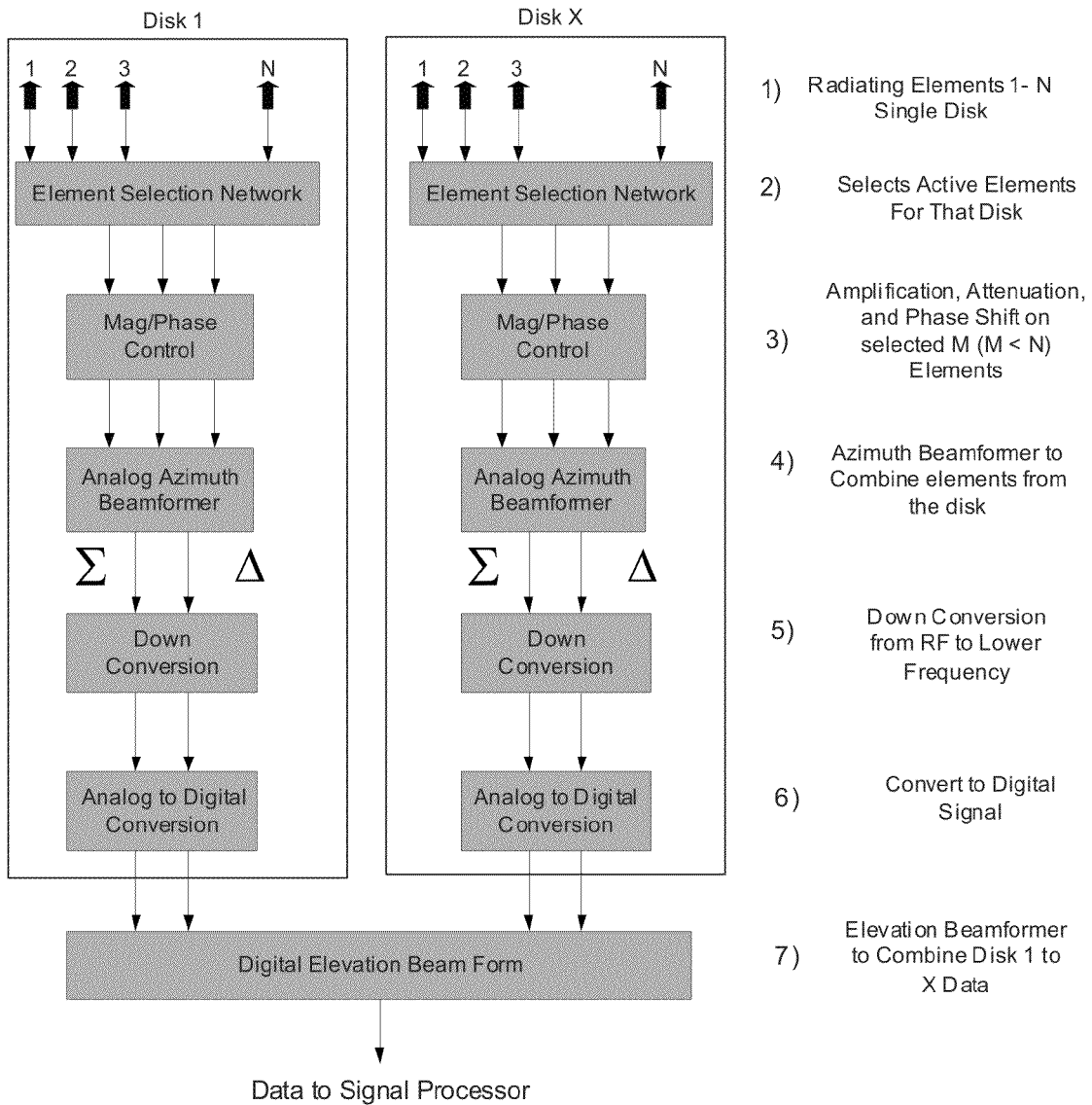
FIG. 5 is a flowchart showing beamforming according to one embodiment of the present invention.

In one embodiment, each disk 14 contains at least radiating elements 12, element selection circuitry, amplification, magnitude and phase control, and an azimuth beamforming network to combine elements coherently. The element selection circuitry is used to reduce the number of magnitude and phase control components required. For instance, if one-third of each disk were used to form a beam, than a 3:1 switch could be used to route elements 120° apart to a common set of amp/ph modules. Any other components present on the disk depend on the implementation of the elevation beamforming network. In the digital case, shown in FIG. 5, after the azimuth beamformer has formed the sum ($\Sigma$) and Difference ($\Delta$) beams for monopulse estimation, the data streams are downconverted from RF to a lower frequency for analog to digital conversion. After analog to digital conversion and digital demodulation (not shown), the contributions from the different disks are combined digitally to form the elevation beam on receive.

Figure 6:
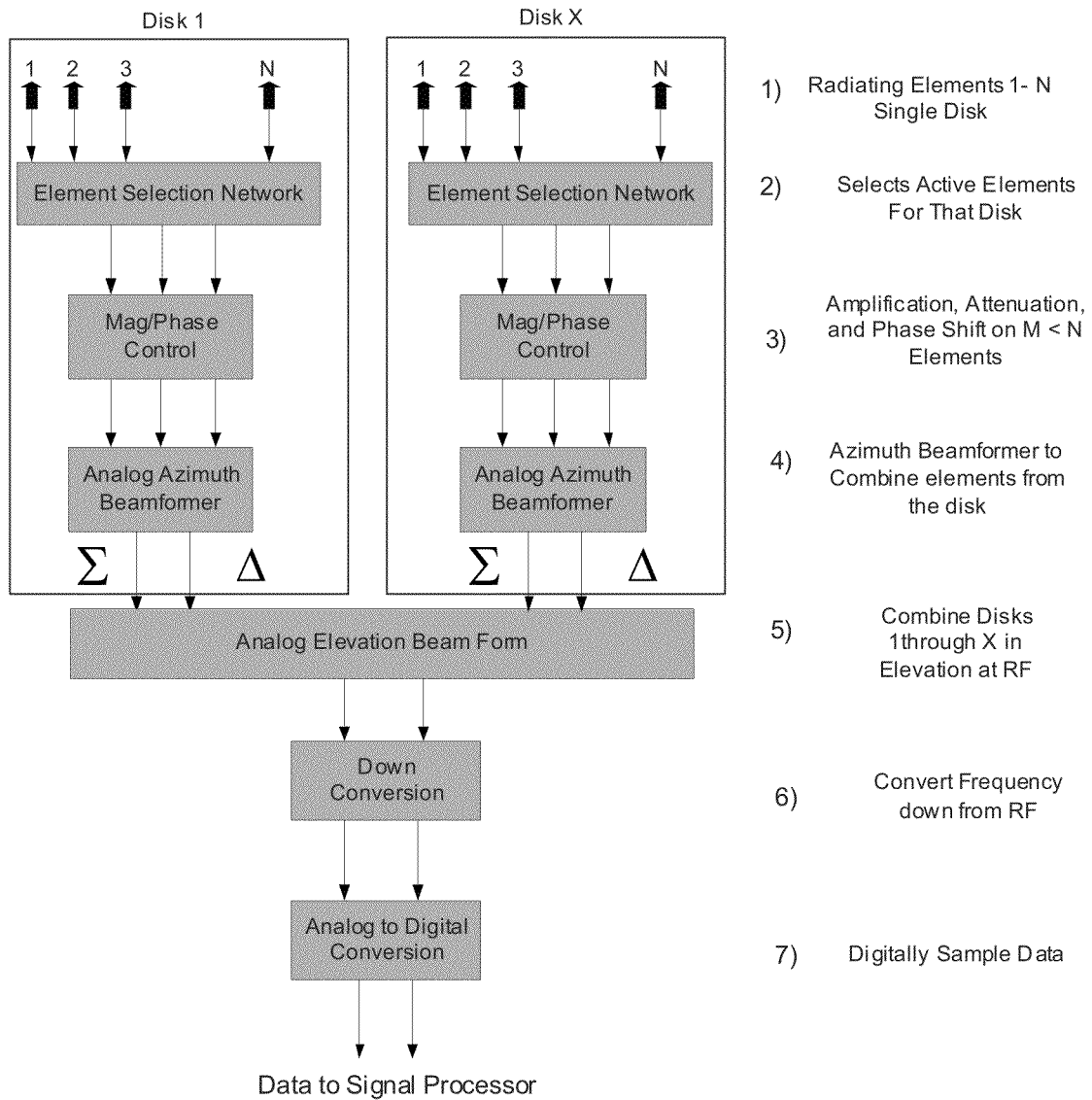
FIG. 6 is a flowchart showing beamforming according to one embodiment of the present invention.

On transmit, the process is reversed with digital coefficients converted to analog at each disk, run through the azimuth beamformer, and transmitted out of the elements. In the analog elevation beamforming case, the analog outputs from each disk's azimuth beamformer are sent to an elevation beamformer prior to frequency conversion, sampling, and signal processing, as seen in FIG. 6. This architecture allows for hemispheric coverage and the ability to scan to any location on the hemisphere while reducing the number of magnitude and phase control components and significantly reduced beamforming components and logic compared to previous hemispherical scanning antenna implementations.

Figure 7:
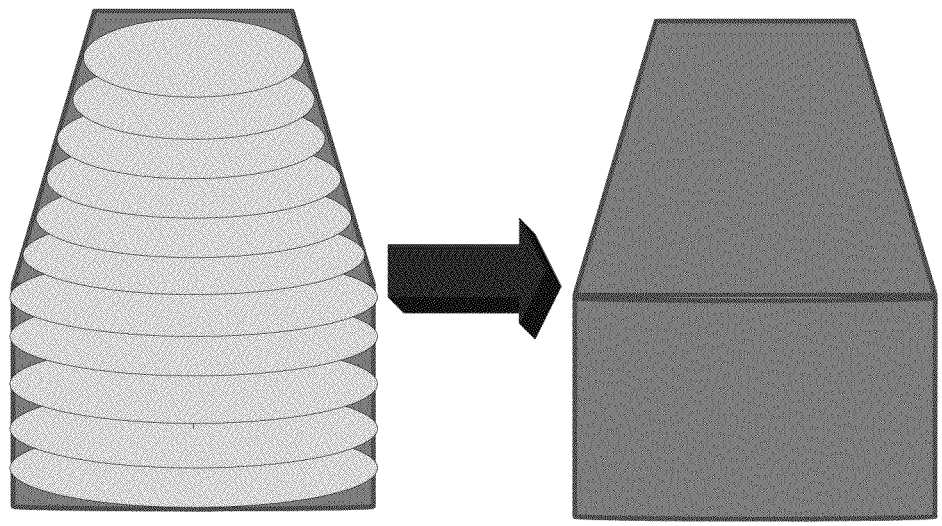
FIG. 7 is a representation of an antenna according to one embodiment of the present invention.

In yet another embodiment, disks 14 can be added to the antenna structure to enhance aperture (and hence gain) in any direction, with the number and diameter of each disk defining an envelope of the radiating elements, as shown in FIG. 7. Alternatively, the antenna envelope can be any shape that suitably contains the necessary elements and satisfies other design requirements emanating from the anticipated use(s) of the antenna. Indeed, several design parameters of an AESA radar's shape are variable according to the specific needs of the user. These include, among others, the following: (i) the height of the generally cylindrical portion of the radar (with a height of zero if only the conical portion is used); (ii) the diameter of the cylindrical portion, if used; (iii) the height of the generally conical portion of the radar; (iv) the diameter of the cone's bottom section; (v) the diameter of the cone's top section; (vi) the angle of the outer section of the generally conical portion; and (vii) the curvature of the conical section (which can be used for the purpose of coverage volume optimization).

Figure 8:
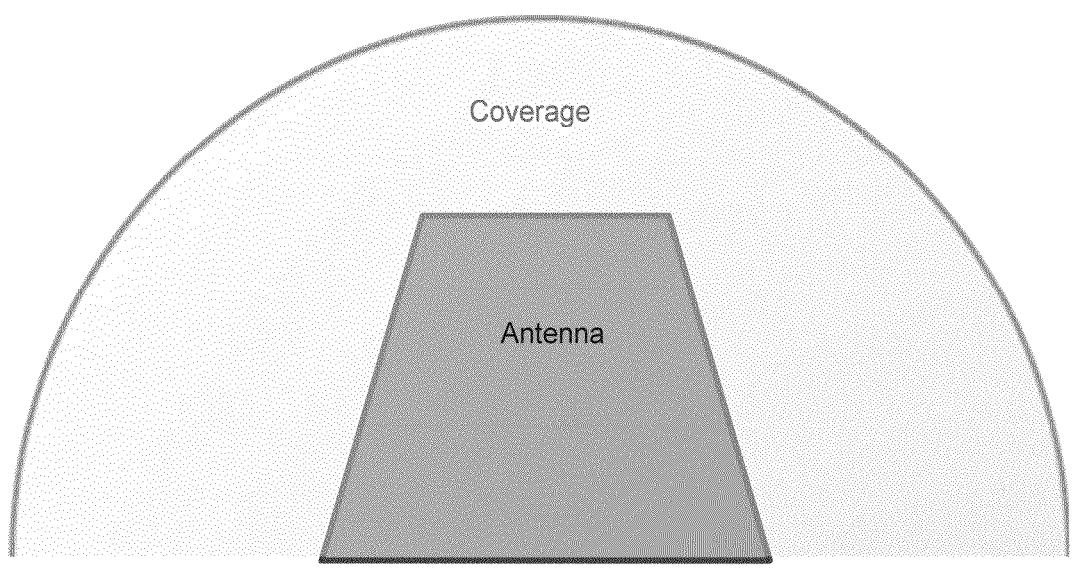
FIG. 8 is a representation of an antenna with hemispheric coverage according to one embodiment of the present invention.
Figure 9:
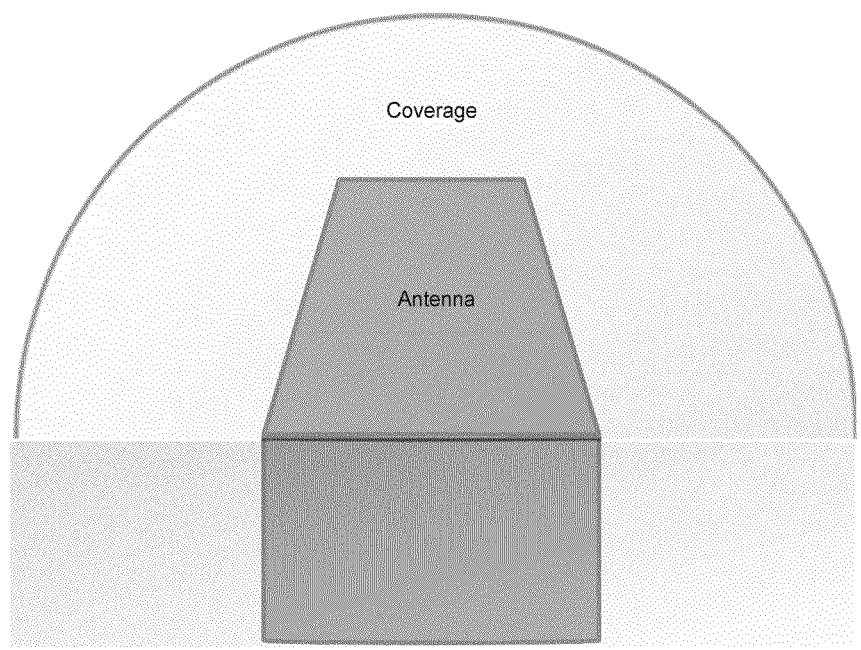
FIG. 9 is a representation of an antenna with hemispheric and horizon coverage according to one embodiment of the present invention.
Figure 10:
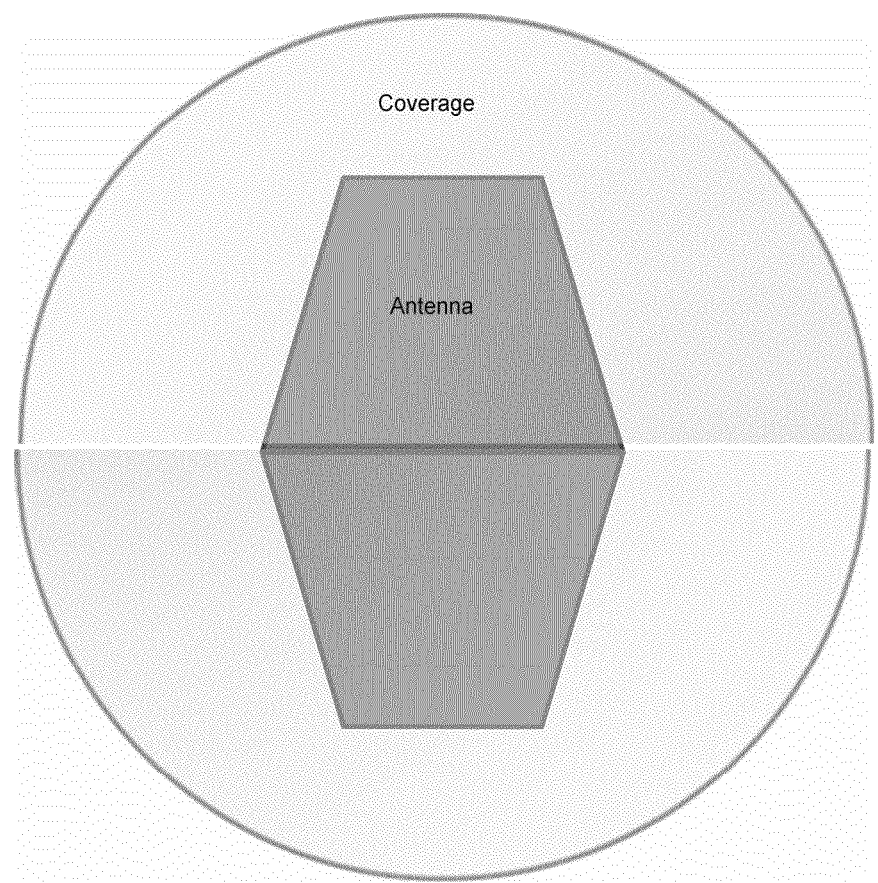
FIG. 10 is a representation of an antenna with spheric coverage according to one embodiment of the present invention.

In this manner, coverage can be obtained in a number of different manners, including hemispheric coverage (shown in FIG. 8), hemispheric with extra energy at the horizon (FIG. 9), or even spherical coverage (FIG. 10). In the embodiment shown in FIG. 9, one implementation could utilize all disks for 0° to 60° elevation coverage, and only utilize the conical section to form beams from 60° to 90° elevation.

Unique benefits of this architecture to obtain hemispheric coverage include:
1) Scalability and flexibility: By adding disks, power and gain can be easily tailored in any search section of interest.
2) Uniform Azimuth coverage over 360° for a given elevation angle: Multi-faceted planar arrays have been used to provide 360° azimuth coverage and may provide 90° of elevation coverage if tilted properly. However, when steering off boresight in azimuth, the active plane will have sensitivity and accuracy degradation as the effective aperture of the planar surface is reduced. In addition, multi-faceted arrays will typically require more components to achieve the same coverage volume and performance characteristics.
3) Ability to scan asynchronously: Unlike a mechanically scanned planar array at a tilt-back angle that rotates, any azimuth or elevation position can be serviced at any time. This makes the architecture very flexible at adapting to dynamic operational scenarios.
4) Reduction in Control Channels: Other antenna architectures that provide hemispheric coverage such as a geodesic dome design require complex and expensive receive channels. Each element output must either be combined in a complicated switching network or sampled directly to provide allow a beam to be formed in any direction.
5) Graceful Degradation: By arranging the elements at the disk level, if a single beamformer or analog to digital converter (in the digital elevation beamforming case) were to fail, there would not be significant degradation in either dimension.

Figure 11:
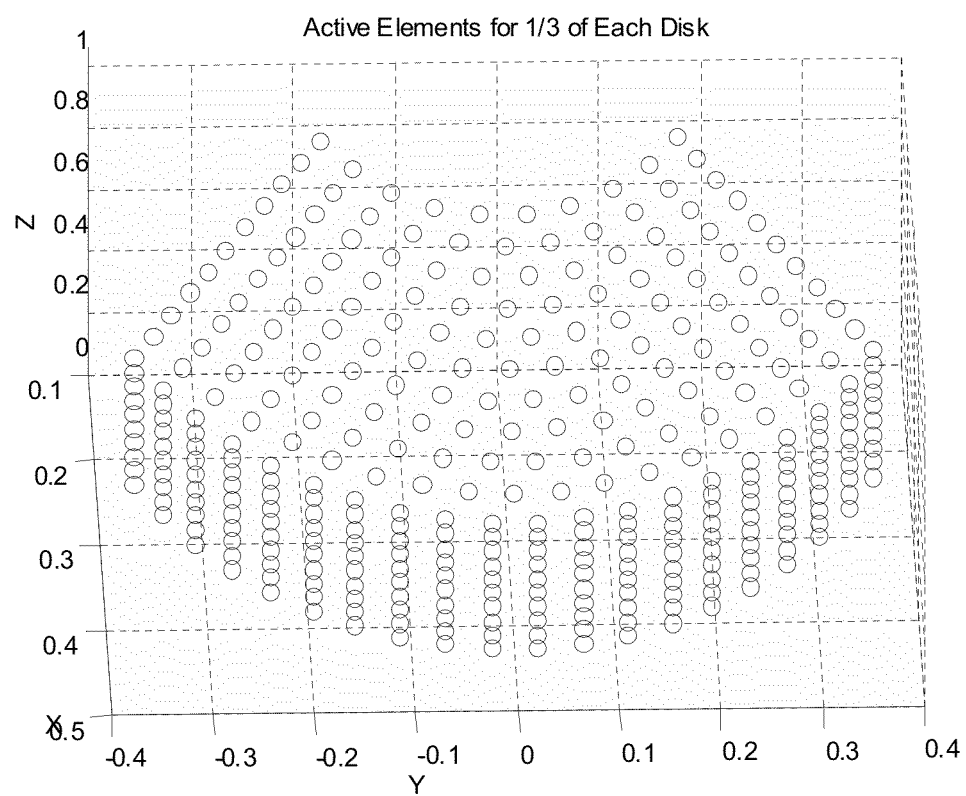
FIG. 11 is a schematic representation of the locations of elements in an antenna according to one embodiment of the present invention.

According to one embodiment of the present invention, FIG. 11 shows element locations for an antenna having 20 disks, each with between 60 and 30 elements per disk with an effective tilt-back angle of 34.5 degrees for the conic section. This array, therefore, would have a total of 1035 elements. Assuming one-third of the array (335 elements) is active to form a coherent beam, the element locations shown in FIG. 11 would be used.

In yet another embodiment, the cylindrical portion of antenna 10 is a fixed diameter with a height equivalent to 32 rows of antenna elements. Each row contains 72 elements for a total of 2304 elements in the cylindrical section. The conical section has a height equivalent to 16 rows with a total of 744 elements; 24 elements are arranged in the top row and the remaining 720 elements form the remaining 15 rows of the cone. In this preferred embodiment, there are 2304 elements in the cylindrical section serviced by a total of 768 amp/ph modules (24 in each row). There are 744 elements in the conical section serviced by a total of 248 amp/ph modules (with a variable number per row). However, the $\Sigma$ Azimuth and $\Delta$ Azimuth paths from all amp/ph modules in a row are combined together, so there are only 48 channels for the 48 rows of AESA radar 10. As a result, the radar is only required to control these 48 channels—rather than 3048 channels for each antenna element—to create a single beam type over the hemisphere of the radar.

All units are in meters with dimensions determined using half wavelength (λ) spacing in azimuth and elevation at 3.3 GHz (S-Band). The resulting aperture at the horizon is 0.6145 m². The gain of a radar antenna can be calculated as:

$$G = \frac{4\pi \cdot A_e}{\lambda^2},$$

where G is the gain of the antenna and $A_e$ is the effective aperture of the antenna. The effective aperture is the physical area times the aperture efficiency of the antenna. Assuming 70% efficiency for the example antenna would yield a gain of 28.1 dBi. If the tapered portion were not there (as in the case where 2 separate radars were used to cover the horizon and zenith), the aperture would be reduced to 0.3419 m and the gain to 25.6 dBi. The elevation beamwidth would also increase, leading to lower detection accuracy. This shows the advantage of having a single integrated antenna where the smaller discs can be used to provide greater elevation coverage and enhance performance on the horizon. This antenna requires 20 azimuth beamformers (1 per disk) and 1 elevation beamformer (analog or digital). The number of down-conversion chains would be 20 in the digital beamforming case or 1 in the analog beamforming case.

Although the present invention has been described in connection with a preferred embodiment, it should be understood that modifications, alterations, and additions can be made to the invention without departing from the scope of the invention as defined by the claims.

What is claimed is:

1. An AESA antenna architecture comprising:
 a first region comprising a first plurality of antenna elements arranged on the exterior circumference of a first plurality of platters, said platters forming a generally cylindrical array;
 a second region comprising a second plurality of antenna elements arranged on the exterior circumference of a second plurality of platters, said platters being the same shape and being concentrically stacked to form a generally conical array, wherein the diameter of each of said second plurality of platters gradually decreasing from a platter having a maximum diameter at the base of said generally conical array to a platter having a minimum diameter at the top of said generally conical array; and
 a plurality of amplitude/phase modules, wherein each of said plurality of amplitude/phase modules is coupled to at least two antenna elements.

2. The antenna architecture of claim 1, wherein each of said first and second plurality of platters is circular.

3. The antenna architecture of claim 2, wherein said first plurality of platters are stacked to form said generally cylindrical array.

4. The antenna architecture of claim 1, further comprising a beamforming network.

5. The antenna architecture of claim 1, wherein each amplitude/phase module comprises a sum (Σ) azimuth beam path and a delta (Δ) azimuth beam path.

6. The antenna architecture of claim 5, wherein the sum (Σ) azimuth beam paths and the delta (Δ) azimuth beam paths from each platter are combined.

\* \* \* \* \*